Figure 1:
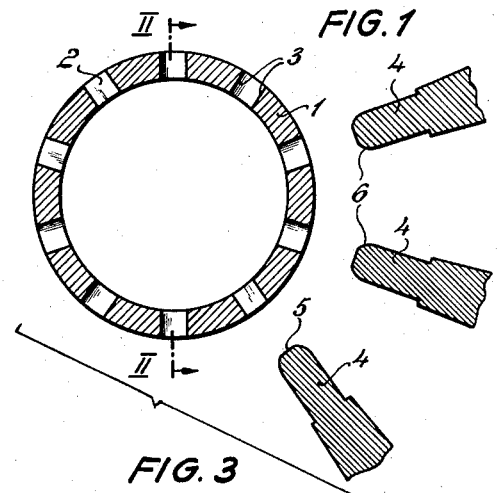

United States Patent Office 2,933,803
Patented Apr. 26, 1960

2,933,803

METHOD OF PRODUCING CAGES FOR ROLLER BEARINGS AND MORE PARTICULARLY FOR NEEDLE ROLLER BEARINGS

Georg Schaeffler, Herzogenaurach, near Nurnberg, Germany, assignor to Industriewerk Schaeffler OHG., Herzogenaurach, near Nurnberg, Germany Application April 19, 1957, Serial No. 653,926

Claims priority, application Germany April 24, 1956

3 Claims. (Cl. 29—148.4)

The invention relates to a method of producing cages for roller bearings and more particularly for needle roller bearings in which the rollers are guided by the cross webs and retained in the windows. It is the object of the invention to make provision for the rollers to be guided in such cages in accurate axial parallelism and at the same time to prevent the rollers from falling out on either side of the cage without impairment of the guiding action of the cage.

Roller bearing cages of this type produced by casting or injection moulding, are already known in which the windows are so contrived that they radially narrow either in the inward or outward direction from a width that exceeds the diameter of the roller to a width that is less than the roller diameter in the vicinity of one of the peripheral surfaces, so that the rollers cannot drop out on that side. The retention of the rollers on the opposite side of the cage is effected by notching the webs near the windows so that the material is deformed into the window and the width of the latter reduced to less than the roller diameter.

Cages for roller bearings are also known in which the windows are originally made smaller than the roller diameter, tools which move in parallelism being subsequently applied at an angle in relation to the connecting line between the centre of the cage and the centre of the roller axis and the material so worked away that the width of the window remains smaller than the roller diameter only at the outer and inner peripheral surfaces of the cage.

Recently, cages with punched and broached windows have gained in importance, in which the plane boundary surfaces of the windows are parallel and projections are formed on the inner and outer peripheries of the cage by deforming the material into the windows and reducing their width to less than the roller diameter. For retaining the rollers on one side of the cage, window cages are known in which the windows are stamped out to a smaller diameter than the roller diameter, the thickness of the material being less than the roller diameter so that the rollers are held by the edges of the stamped out narrower windows. Similar cages made of a thicker material are sometimes so formed that the sharp angular edges are bevelled at a certain angle in the stamping procedure, so that the windows appear partly widened and of wedge-like formation.

Especially in the case of cast cages in which the width of the windows narrows towards one of the peripheral surfaces, the surfaces which guide the rollers are frequently rough and inaccurate. Moreover, it is a matter of considerable difficulty to produce roller cages such as needle roller cages with a large number of pockets by casting or injection moulding techniques. The large number of rollers calls for the provision of extremely complicated and costly tools which make such cages uneconomical to produce especially if, as is usual, the numbers required are small.

Consequently attempts have been made to meet this objection by stamping out tapering surfaces. However, nothing is known as to whether such tapering surfaces with the simultaneous retention of the rollers on both sides of the cage have proved a success in actual practice. Their manufacture presents considerable difficulties. Moreover, if the rollers are to be retained both inside and out the required deformation work is very high and the disadvantage arises that the surfaces of the web are not parallel and lie at an angle to the direction of movement of the cage when oscillations occur. It is known that the cage will run much more smoothly if the walls of the webs are plane-parallel, that is to say if the guiding surfaces are not subjected to additional wear whenever the cage moves in a radial direction.

The invention proposes a method of producing cages for roller bearings and more particularly for needle roller bearings, in which the rollers are guided and held by the edges of the webs that form the windows, the principal feature of the invention being that the windows are first formed with a smaller width than the roller diameter, preferably by stamping them out, and that they are then enlarged to a point beyond the pitch circle by the radial penetration of sizing tools, preferably from the outside, so that their enlarged width will exceed the roller diameter by the required amount of tangential clearance. In other words the method permits the windows to be created in a manner known as such, namely by stamping. The fact that the stamped width can be very accurately maintained by the well defined size of the tools affords the advantage that the smaller stamped width of the windows permits a larger number of needles to be accommodated around the circumference of the cage whilst maintaining the ratio between the widths of the webs and the windows. The windows thus formed are then simultaneously sized by means of sizing tools which concentrically enter the windows in the radial direction and considerably consolidate, smooth, and deform the material on the surfaces of the webs so that with practically the same tools the window width can be produced to very accurate dimensions, whereas the consolidation and smoothing of the material will create better conditions for the revolving rollers than could be obtained by a broaching procedure. By suitably shaping the ends of the tools retaining surfaces for the rollers can be formed on one side of the cage in the same operation. By taking appropriate measures the retention of the rollers on the other side of the cage can likewise be ensured, as will be later described in greater detail. If the sizing tools are rigidly guided windows that are in accurate axial parallelism will be produced and their width can be so controlled that the tangential clearance in the pitch circle will be particularly small and precise.

It is preferred according to the invention to size the windows in such a way that the containing and guiding surfaces for the rollers are parallel. Consequently, any radial movement of the cage due to the play of the cage between the inner and outer races will not cause additional wear of the webs as will be the case when the web surfaces for guiding the rollers are at an angle to the radial direction of play of the cage.

The inner and outer peripheral surfaces of the cage are profiled for various reasons, namely to reduce the weight of the cage, to facilitate the stamping procedure, to create spaces for lubrication and so forth. By employing profiled peripheral surfaces additional advantages accrue when cages are produced by the method according to the present invention. When applying the sizing tools which radially enter the windows roof-like projecting parts of the peripheral surface can yield both in the radial and in the axial direction so that a greater measure of elastic adaptation to the sizing tool can take place at these points. Upon withdrawal of the sizing tools the greater degree of elastic deformation at these points where the peripheral cage surface has roof-like projections will also entail a larger measure of elastic recovery which may be sufficiently pronounced for the roof-like projections to form a retaining edge which will prevent the rollers from dropping out on one side of the cage. This will be formed at the same time as a like edge is produced by the sizing tool on the other side of the cage.

Quite generally the method of subsequently sizing the windows affords the advantage that those parts of the peripheral surface which are exposed at the edge will exhibit a larger measure of elastic recovery than parts of the material which are more central and have all-round support. In other words, elastic recovery at the edges of the peripheral surface will be generally greater than at the level of the pitch circle. The practical result of this effect is that the width of the windows along the peripheral edges on that side from which the tools are inserted will be somewhat reduced.

However, a really reliable retention of the rollers secured by taking advantage of this increased elastic recovery of parts or the whole of projecting surface areas will require some additional deformation which will be the more readily performed because the remaining amount of deformation needed to produce a window that is reliably narrowed at its edge to less than the roller diameter, will now be comparatively small.

The drawings exemplify the subject matter of the invention by showing a number of representative cages that have been produced by the method according to the present invention.

Figure 2:
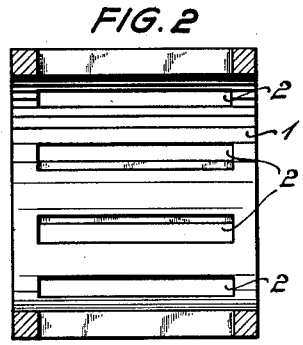
Figure 3:
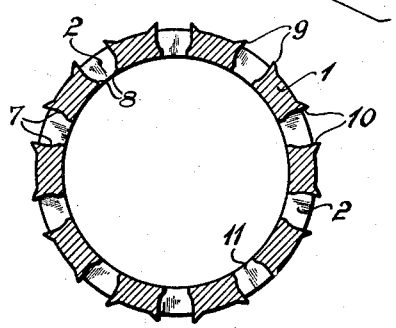
Figure 4:
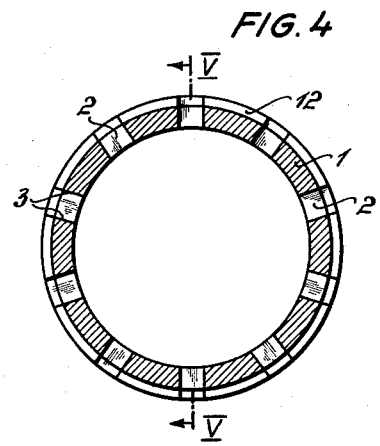
Figure 5:
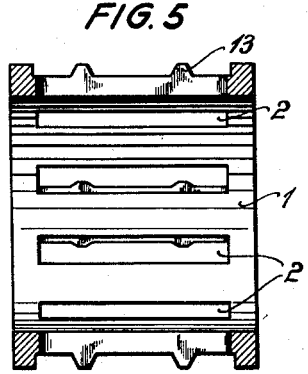

Figure 1 is a side view of a cage for a roller bearing with stamped windows and a smooth cylindrical outer peripheral surface, and several sizing tools arranged concentrically about the periphery of the cage, Figure 2 is the roller bearing cage in a section taken on the line II—II in Figure 1, Figure 3 is the roller bearing cage shown in Figure 1 after the windows have been sized, shown in cross section, Figure 4 is a roller bearing cage with stamped windows with a profiled outer peripheral surface, shown in cross section, Figure 5 is the roller bearing cage according to Figure 4 shown in a section taken on the line V—V in Figure 4.

Figure 6:
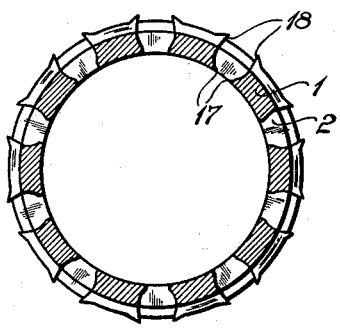
Figure 7:
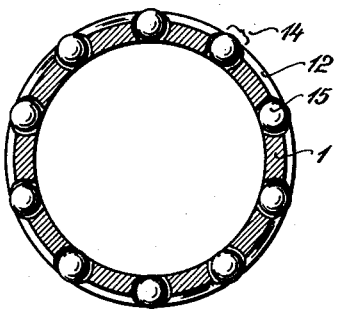
Figure 8:
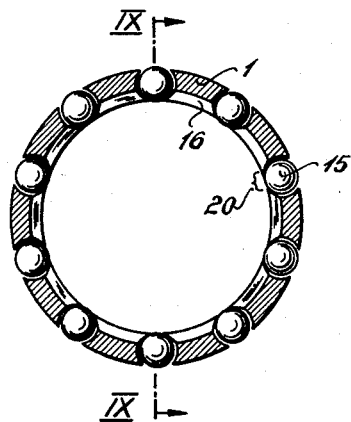
Figure 9:
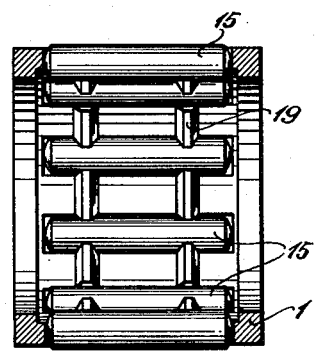

Figure 6 is the roller bearing cage according to Figure 4 after the windows have been sized, in cross section, Figure 7 is the roller bearing cage according to Figure 6 with the rollers inserted, after the outside retaining projections have been formed, shown in cross section, Figure 8 is a roller bearing cage with stamped windows with a profiled inner peripheral surface after sizing and insertion of the rollers, in cross section, and Figure 9 is the same cage shown in a section taken on the line IX—IX in Figure 8.

In the drawings the cage is indicated by 1, whereas 2 are the windows which have a width that is less than the diameter of the rollers they are to contain. The lateral boundary surfaces 3 of the windows 2 are flat. Only three of the sizing tools 4 which are simultaneously introduced into all the windows are actually shown (Figure 1). The width of these sizing tools exceeds the diameter of the rollers by the required tangential clearance and the amount of elastic recovery. The ends 4 of the sizing tools 5 have radii or they are bevelled as shown at 6.

Figure 3 shows the shape of the cage according to Figure 1 after penetration into the windows of the sizing tools 4. The web surfaces 7 have assumed a shape corresponding to that of the sizing tools 4. The material displaced by the penetration of the sizing tools has been partly displaced towards the inside peripheral surface of the cage where it forms the retaining edges 8. The remainder of the material is displaced towards the outer peripheral surface where it forms the projecting edges 9. The lateral boundary surfaces of the windows therefore exhibit a principally plane portions 10 on either side of the pitch circle of the cage and a tapered narrowing portion 11 towards the inside peripheral surface. The projecting edges or points 9 at the outer peripheral surface partly recover elastically when the sizing tools are withdrawn. The amount of recovery may be sufficiently pronounced to reduce the opening of the window at the outer peripheral surface of the cage to less than the width of the window at the level of the pitch circle. In other words, the needles will be retained by the fins formed along the edges of the outer peripheral surface even if no additional deformation of the material has taken place.

Elastic recovery can be promoted by giving the outer peripheral surface a suitable conformation. Figures 4 and 5 illustrate an example of a profiled cage. As will be seen by reference to Figure 5 the outer peripheral surface 12 is provided with ribs 13 which extend radially around the cage. These ribs may be produced by machining or by plastic deformation of the material. Since the amount of elastic recovery for forming the roof-like overhang of the peripheral edges is often not sufficiently great as such to ensure the reliable retention of the rollers, the projecting ribs may be additionally deformed by rolling them down in a manner that is well understood to reduce the gap 14 (Figure 7) to a size that will definitely be less than the diameter of the rollers 15.

Figure 6 shows the profiled cage according to Figures 4 and 5 after the windows have been sized by the concentrically penetrating sizing tools. As in the example shown in Figure 3 retaining edges 17 and overhanging fins 18 have been formed which hold the rollers inside the cage. In the form of construction illustrated by Figure 7 the rollers 15 are shown inserted into the cage and the retaining edges 18 are shown after their formation so that the rollers 15 cannot now fall out of the cage.

In the embodiments shown in Figures 8 and 9 the inner peripheral surface 16 is profiled with overhanging roof-like projections 19. In this instance the sizing tool has been arranged to penetrate from the inside outwards and the projecting ribs have been rolled down on the inside to create overhanging projections 20 for stopping the needles 15 from falling out on the inside of the cage.

I claim:

1. A method of manufacturing roller bearing cages, more particularly needle roller bearing cages, in which the rollers are guided on flat parallel web surfaces at the pitch circle and are retained, inside the pitch circle, by constricted windows, characterised in that the windows are first formed, in a known manner, preferably by stamping, with a smaller width than the roller diameter, and then, by sizing in a radial direction so as to produce flat parallel surfaces extending beyond the pitch circle of the cage, are given a width which exceeds the roller diameter by the necessary tangential clearance of the rollers, and that the material displaced in a radial direction during the sizing is used to form radial retaining projections for the needles.

2. A method of manufacturing a roller bearing cage, comprising making a hollow blank in the form of a body of revolution which has an inner and an outer peripheral surface, forming in said blank a plurality of apertures in the form of slots which each have two flat sides parallel to one another and which have a slot width slightly less than the roller diameter, radially displacing the material of the slot sides whereby radially projecting slot edge portions on each side of each slot are formed at one peripheral surface and the width of each slot is made slightly greater than the roller diameter in a first region adjacent to said one peripheral surface and the sides of the slot are kept flat and parallel to one another in said first region and the slot width is kept less than the roller diameter in a second region adjacent to the other peripheral surface, and bending the projecting edge portions of each slot towards one another.

3. A method of manufacturing a roller bearing cage, comprising making a hollow blank in the form of a body of revolution which has an inner and an outer peripheral surface and has on one of said peripheral surfaces a plurality of ridges extending round the whole of the periphery of the blank, forming in said blank a plurality of apertures in the form of slots which extend transversely to the ridges and pass through the ridges and each have two flat sides parallel to one another and have a slot width slightly less than the roller diameter, radially displacing the material of the slot sides whereby radially projecting slot edge portions are formed on the ridges and the width of each slot is made slightly greater than the roller diameter in a first region adjacent to said one peripheral surface and the sides of the slot are kept flat and parallel to one another in said first region and the slot width is kept less than the roller diameter in a second region adjacent to the other peripheral surface, and deforming the projecting edge portions to make the slot width at the ridges less than the roller diameter.

References Cited in the file of this patent

UNITED STATES PATENTS

| | | |
|---|---|---|
| 1,330,158 | Arnold | Feb. 10, 1920 |
| 2,711,938 | Herrmann | June 28, 1955 |
| 2,765,518 | Lovell | Oct. 9, 1956 |
| 2,774,132 | Squire | Dec. 18, 1956 |

FOREIGN PATENTS

| | | |
|---|---|---|
| 920,331 | Germany | May 31, 1955 |